United States Patent
Youn et al.

(10) Patent No.: US 10,355,484 B2
(45) Date of Patent: Jul. 16, 2019

(54) HIGHLY EFFICIENT POWER SUPPLY UNIT AND METHOD FOR SUPPLYING POWER USING SAME

(71) Applicant: NAVER Business Platform Corp., Seongnam-Si, Gyeonggi-Do (KR)

(72) Inventors: Yong Soo Youn, Seongnam-si (KR); Keun Ho Ryu, Seongnam-si (KR)

(73) Assignee: NAVER Business Platform Corp., Seongnam-si (KR)

( * ) Notice: Subject to any disclaimer, the term of this patent is extended or adjusted under 35 U.S.C. 154(b) by 54 days.

(21) Appl. No.: 15/643,733

(22) Filed: Jul. 7, 2017

(65) Prior Publication Data
US 2017/0310107 A1 Oct. 26, 2017

Related U.S. Application Data

(63) Continuation of application No. 14/378,054, filed as application No. PCT/KR2013/000389 on Jan. 18, 2013, now Pat. No. 9,762,058.

(30) Foreign Application Priority Data

Feb. 22, 2012 (KR) .................. 10-2012-0017848
Jan. 2, 2013 (KR) .................. 10-2013-0000219

(51) Int. Cl.
*H02J 3/10* (2006.01)
*H02J 1/10* (2006.01)
(Continued)

(52) U.S. Cl.
CPC .................. *H02J 3/10* (2013.01); *G06F 1/30* (2013.01); *H02J 1/102* (2013.01); *H02J 5/00* (2013.01);
(Continued)

(58) Field of Classification Search
CPC ...... H02J 1/102; H02J 3/10; H02J 5/00; H02J 7/02; H02J 9/061; G06F 1/30; Y10T 307/62
(Continued)

(56) References Cited

U.S. PATENT DOCUMENTS 6,330,176 B1   12/2001   Thrap et al.
8,004,115 B2   8/2011   Chapel et al.
(Continued)

FOREIGN PATENT DOCUMENTS

CN   101690404 A   3/2010
CN   101803148 A   8/2010
(Continued)

OTHER PUBLICATIONS

International Search Report PCT/ISA/210 for International Application No. PCT/KR2013/000389 dated Apr. 18, 2013.
(Continued)

*Primary Examiner* — Hal Kaplan
(74) *Attorney, Agent, or Firm* — Harness, Dickey & Pierce, P.L.C.

(57) ABSTRACT

A more efficient power supply unit and a method for supplying power using same are disclosed. The power supply unit comprises a relay for switching alternating current power supplied from a plurality of sources; a direct current power supply for converting the switched current power to direct current power; and a controller for generating a switch signal to control the relay to switch the sources on the basis of the result for monitoring the alternating current power supplied from the sources.

7 Claims, 14 Drawing Sheets

(51) Int. Cl.
*H02J 5/00* (2016.01)
*H02J 9/06* (2006.01)
*G06F 1/30* (2006.01)
*H02J 7/02* (2016.01)

(52) U.S. Cl.
CPC ............... *H02J 7/02* (2013.01); *H02J 9/061* (2013.01); *Y10T 307/62* (2015.04)

(58) Field of Classification Search
USPC .......................................................... 307/65
See application file for complete search history.

(56) References Cited

U.S. PATENT DOCUMENTS

| | | | |
|---|---|---|---|
| 8,080,900 | B2 | 12/2011 | Corhodzic et al. |
| 8,918,656 | B2 | 12/2014 | Munjal et al. |
| 2009/0021078 | A1 | 1/2009 | Corhodzic et al. |
| 2010/0042860 | A1 | 2/2010 | Kwon et al. |
| 2010/0332873 | A1 | 12/2010 | Munjal et al. |
| 2011/0006607 | A1 | 1/2011 | Kwon et al. |
| 2011/0304211 | A1 | 12/2011 | Peterson et al. |
| 2011/0310647 | A1* | 12/2011 | Humphrey .......... H02M 3/1584 363/126 |

FOREIGN PATENT DOCUMENTS

| | | | |
|---|---|---|---|
| JP | H07-295688 | A | 11/1995 |
| JP | 2000102194 | A | 4/2000 |
| JP | 2001-178020 | A | 6/2001 |
| JP | 2002034177 | A | 1/2002 |
| JP | 2007-026083 | A | 2/2007 |
| JP | 2008-070589 | A | 3/2008 |
| JP | 2009-140138 | A | 6/2009 |
| JP | 2011125124 | A | 6/2011 |
| KR | 20050000565 | A | 1/2005 |
| KR | 20090039119 | A | 4/2009 |
| KR | 20100021921 | A | 2/2010 |
| KR | 20100051069 | A | 5/2010 |
| KR | 20110003035 | A | 1/2011 |
| TW | 201113682 | A | 4/2011 |
| WO | WO-2008/113047 | A2 | 9/2008 |
| WO | WO-2009/012451 | A2 | 1/2009 |
| WO | WO-2011/156100 | A1 | 12/2011 |

OTHER PUBLICATIONS

Jong et al. "DC power distribution for server farms", KEMA Consulting, Sep. 2007.
Korean Office Action for KR-10-2013-0000219 dated Dec. 23, 2013.
Korean Office Action for KR-10-2012-0017848 dated Aug. 16, 2013.
Japanese Office Action dated Sep. 1, 2015 issued in corresponding Japanese Application No. 2014-557558.
Japanese Office Action dated Dec. 8, 2015 issued in corresponding Japanese Application No. 2014-557558.
Extended European Search Report dated Dec. 17, 2015 issued in corresponding European Application No. 13751623.3.
Chinese Office Action dated Mar. 3, 2016 in corresponding Application No. 201380010039.5.
European Office Action dated Feb. 7, 2017 for corresponding European Patent Application No. 13751623.3.
Japanese Office Action dated Feb. 28, 2017 for corresponding Japanese Patent Application No. 2016-092572.
Japanese Office Action for corresponding Japanese Patent Application No. 2016-092572 dated Aug. 15, 2017.

* cited by examiner (a)

(b)

HIGHLY EFFICIENT POWER SUPPLY UNIT AND METHOD FOR SUPPLYING POWER USING SAME

CROSS-REFERENCE TO RELATED APPLICATION

This application is a continuation of U.S. patent application Ser. No. 14/378,054, filed Aug. 11, 2014, which is a National Phase of PCT/KR2013/000389, filed on Jan. 18, 2013, which claims priority under 35 USC § 119 to Korean Patent Application No. 10-2012-0017848, filed on Feb. 22, 2012 and Korean Patent Application No. 10-2013-0000219, filed on Jan. 2, 2013, in the Korean Intellectual Property Office (KIPO), the entire contents of each of which are incorporated by reference herein in their entirety.

TECHNICAL FIELD

Example embodiments relate to a highly efficient power supply device for supplying power to a rack and a power supply method using the same.

BACKGROUND ART

Recently, with the emergence of a large data center, research is ongoing to convert a data center based on an alternating current (AC) power transfer to a data center based on a more efficient direct current power transfer.

In this regard, Korean Patent Laid-Open Publication No. 10-2011-003035, published on Jan. 11, 2011, titled "Direct current (DC) electric power supply system", discloses technology in which a DC power supply system receives AC power and directly supplies, to a plurality of servers, DC power output from a rectifier configured to generate the DC power.

However, the conventional power supply system uses an individual power supply unit (PSU) for each server. Accordingly, when an error occurs in supplying power due to, for example, an overload, a blackout, the fault of a PSU, it may critically affect a server operation. Also, the power efficiency may vary based on a state of a PSU individually used for each server and thus, it may be difficult to achieve the maximum effect.

Accordingly, there is a need for a method that may prevent a data loss from occurring due to, for example, an overload, a blackout, and the fault of a PSU, and may maintain the power efficiency to be in an optimal state.

SUMMARY

Some example embodiments provide a more efficient power supply device that may reduce or prevent a data loss from occurring due to, for example, the fault of a power supply unit (PSU), a blackout, and an overload, and a power supply method using the same.

Some example embodiments also provide a more efficient power supply device that may more efficiently supply power by decreasing an amount of power unnecessarily used, and a power supply method using the same.

Some example embodiments also provide a more efficient power supply device that may more effectively reduce or prevent a voltage drop phenomenon occurring in response to switching input voltage, and a power supply method using the same.

Some example embodiments also provide a more efficient power supply device that may reduce a management and maintenance cost, and a power supply device using the same.

Some example embodiments also provide a more efficient power supply device that may supply auxiliary power for a relatively long period of time compared to a period of time maintained in an existing PSU, and a power supply method using the same.

Accordingly, there is a need for a method that may prevent a data loss from occurring due to, for example, an overload, a blackout, and the fault of a PSU, and may maintain the power efficiency to be in an optimal state.

According to some example embodiments, there is provided a power supply device, including a relay configured to switch alternating current (AC) power supplied from a plurality of sources, a direct current (DC) power supply configured to convert the switched AC power to DC power, and a controller configured to generate a switch signal so as for the relay to switch the sources based on a result of monitoring the AC power supplied from the sources.

According to some example embodiments, the power supply device may further include a monitoring unit configured to monitor the AC power input from the sources.

According to some example embodiments, the controller may switch a supply of the AC power from a first source to a second source when unstable AC power is input from the first source for a predetermined or desired period of time or more, and may switch the supply of the AC power from the second source to the first source when the unstable AC power is input from the second source for the predetermined or desired period of time or more.

According to some example embodiments, the controller may switch the supply of the AC power to any one of the first source and the second source and then maintain a switched state for a predetermined or desired period of time, and may switch the supply of the AC power to an original state when normal AC power is input from a source from which the unstable AC power is input.

According to some example embodiments, the power supply device may further include an instantaneous power supply configured to reduce or prevent an occurrence of a voltage drop phenomenon by supplying the DC power to the plurality of servers when switching a supply of the AC power.

According to some example embodiments, the instantaneous power supply may include at least one of a capacitor and a lithium (Li) polymer battery.

According to some example embodiments, the instantaneous power supply may block an effect against the DC power being supplied, using at least one of a diode and a field effect transistor (FET) in the case of charging.

According to some example embodiments, the DC power supply may be connected with a plurality of power supply units (PSUs) in parallel.

According to some example embodiments, the power supply device may further include a remote power monitoring unit configured to monitor an operating state of each of the servers, and to activate or inactivate each of the plurality of PSUs based on the operating state of the corresponding server.

According to some example embodiments, the power supply device may further include an integrator configured to integrate and distribute the DC power to be supplied to a plurality of servers included in a rack.

According to some example embodiments, the power supply device may further include an interface board provided in each of the plurality of servers to supply the distributed DC power to the corresponding server.

According to some example embodiments, the interface board may include an inrush current prevention circuit configured to prevent an occurrence of a voltage drop phenomenon by inrush current occurring in the servers when applying initial power to the servers.

According to some example embodiments, there is provided a power supply method, the method including switching AC power supplied from a plurality of sources, converting the switched AC power to DC power, and generating a switch signal so as for the relay to switch the sources based on a result of monitoring the AC power supplied from the sources.

According to some example embodiments, it is possible to reduce or prevent a data loss from occurring due to, for example, the fault of a power supply unit (PSU), a blackout, and an overload by multiplexing alternating current (AC) power supplied from a plurality of sources, by converting the AC power to direct current (DC) power, by supplying the DC power based on a rack unit disposed in a data center, and by in this instance, monitoring the AC power being supplied, and by switching a source supplying the AC power based on a monitoring result.

According to some example embodiments, it is possible to reduce an amount of power unnecessarily used and to maintain the power efficiency to be at a higher or maximum value at all times by monitoring an operating state of each server using a remote power monitoring unit, and by selectively activating or inactivating each of a plurality of PSUs based on the operating state of the corresponding server.

According to some example embodiments, it is possible to more effectively reduce or prevent a voltage drop phenomenon occurring in response to switching input power by supplying charged DC power when switching the input power.

According to some example embodiments, it is possible to reduce a management cost and/or maintenance cost and to complete charging faster using a semi-permanently available charging material.

According to some example embodiments, it is possible to supply auxiliary power for a relatively long period of time compared to a period of time maintained in an existing PSU by supplying the auxiliary power to each server using an interface board provided in each server to supply DC power to the corresponding server.

DETAILED DESCRIPTION

Hereinafter, some example embodiments will be described in detail with reference to the accompanying drawings.

Figure 1:
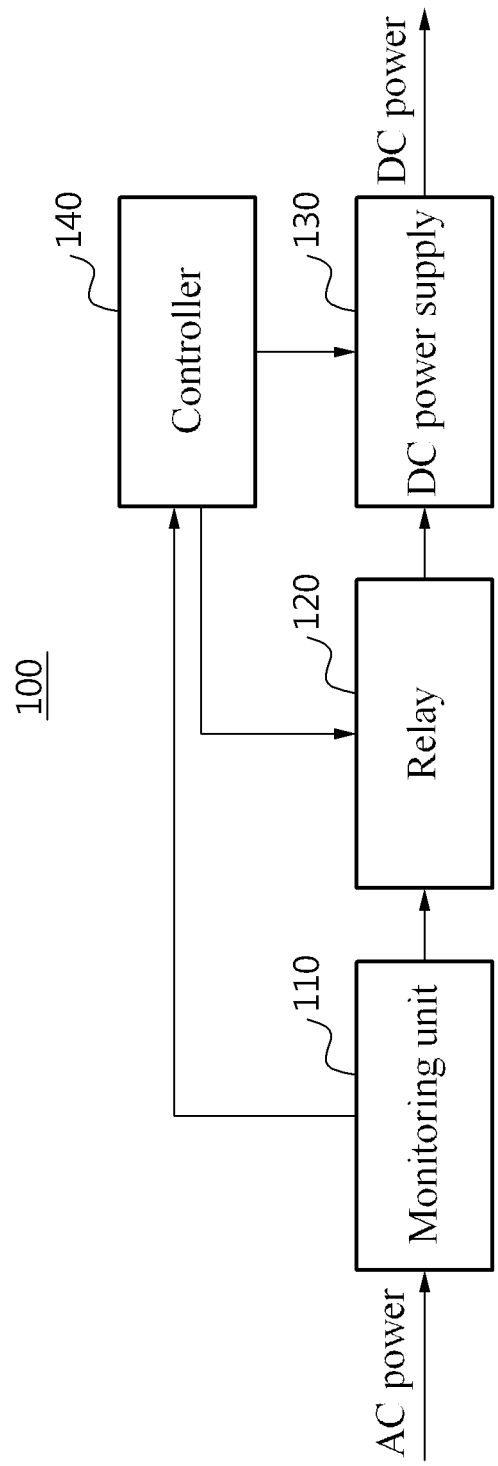
FIG. 1 is a block diagram illustrating a power supply device according to some example embodiments.

FIG. 1 is a block diagram illustrating a power supply device according to some example embodiments in more detail.

A power supply device 100 may supply stable direct current (DC) power based on a rack unit disposed in a data center, and may also maintain the power efficiency to be in an improved or optimal state. Referring to FIG. 1, the power supply device 100 may include a monitoring unit 110, a relay 120, a DC power supply 130, and/or a controller 140.

When unstable power is supplied to a rack due to, for example, an overload and a blackout, data recorded in a server may be lost. To prevent this, the power supply device 100 may receive alternating current (AC) power from a plurality of sources, may multiplex the received AC power, may convert the multiplexed AC power to DC power, and may supply the converted DC power to a plurality of racks.

As an example, high voltage AC power may be input from a first source and a second source to the power supply device 100. The power supply device 100 may selectively switch ON or OFF the AC power input from the first source and the second source using the relay 120, and may multiplex the input AC power using a switching method.

The monitoring unit 110 monitors the AC power input to the power supply device 100. For example, the monitoring unit 110 may sense each of voltage and current of the AC power input from the first source and voltage and current of the AC power input from the second source, and may transmit a sensing value to the controller 140.

The relay 120 switches a supply of the AC power input to the power supply device 100 to any one of the first source and the second source, based on a switch signal transmitted from the controller 140. The relay 120 may be, for example, a solid state relay (SSR).

The DC power supply 130 converts, to DC power, the AC power multiplexed and thereby supplied through the relay 120, and supplies the converted DC power to a plurality of servers. As an example, the DC power supply 130 may convert, to 12V/100 A of DC power, 220V of AC power supplied to the power supply device 100. The DC power supply 130 may include a plurality of power supply units (PSUs) configured to convert the supplied AC power to the DC power. The PSUs may be connected in parallel to supply the DC power based on a rack unit.

As an example, when twenty servers each having the power capacity of 20 A are included in a single rack, the rack requires a total of 400 A power capacity. Accordingly, when operating the twenty servers included in the single rack, the DC power supply 130 may include five PSUs configured to provide 200 A of DC power capacity. Accordingly, although any one of the five PSUs malfunctions, the DC power supply 130 may supply 400 A of DC power capacity using the remaining four PSUs, thereby enabling the power to be more efficiently supplied to the rack.

The controller 140 generates a switch signal for switching a supply of the AC power to any one of the first source and the second source based on a monitoring result received from the monitoring unit 110, and transmits the switch signal to the relay 120. As an example, when unstable AC power is input from the first source for a predetermined or desired period of time or more, for example, 50 ms or more, the controller 140 may switch a supply of the AC power from the first source to the second source. Similarly, when unstable AC power is input from the second source for a predetermined or desired period of time or more, the controller 140 may switch the supply of the AC power from the second source to the first source.

According to some example embodiments, the controller 140 may include a function of monitoring AC power supplied from a plurality of sources to the power source device 100 to switch the supply of the AC power to any one of the first source and the second source based on the monitoring result.

When the supply of the AC power is switched by the controller 140, instantaneous input voltage is blocked and an operation of a PSU is suspended whereby a voltage drop phenomenon, for example, a dip phenomenon occurs in output power. To reduce or prevent this, the power supply device 100 may further include an instantaneous power supply (see 350 of FIG. 3) configured to supply DC power to the plurality of servers included in a rack when switching the supply of the AC power.

As an example, the instantaneous power supply may include at least one of a capacitor and a lithium (Li) polymer battery. In some example embodiments, the instantaneous power supply may supply DC power charged in the capacitor or the Li polymer battery when switching the supply of the AC power. When charging, for example, the capacitor or the Li polymer battery, it may affect DC power to be supplied to a PSU. To reduce or prevent this, the instantaneous power supply may use at least one of a diode and a field effect transistor (FET).

The controller 140 may maintain the switched state for a predetermined or desired period of time, for example, five to ten minutes after switching the supply of the AC power, and may monitor the AC power being supplied. When normal AC power is input from a source from which unstable AC power has been supplied as the monitoring result, the controller 140 may also switch a supply of power to an original state again.

Figure 8:
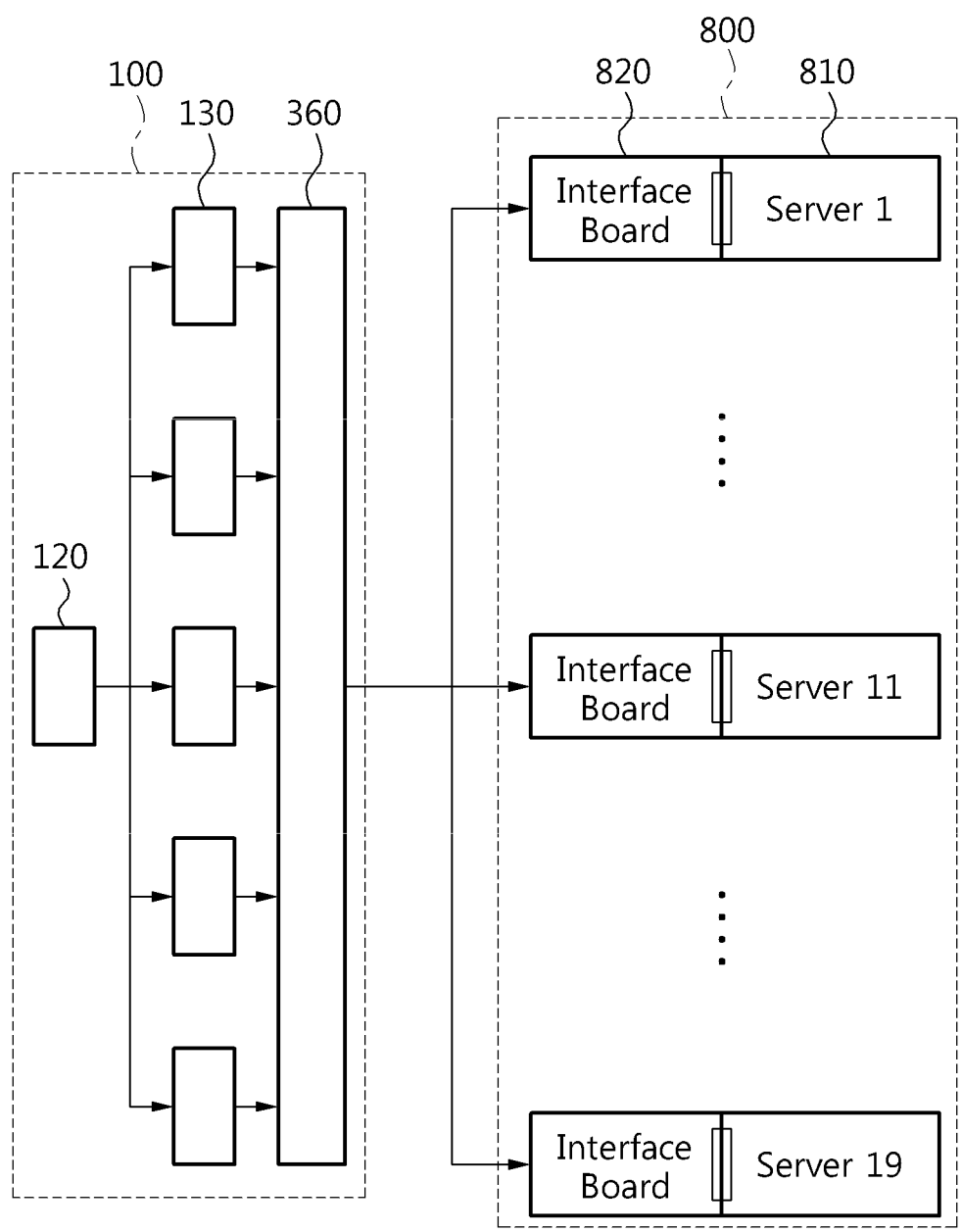
FIG. 8 is a diagram describing a process of supplying DC power from a power supply device to a plurality of servers included in a rack according to some example embodiments in more detail.

The DC power supplied from the DC power supply 130 may be integrated and distributed through an integrator (see 360 of FIG. 3), and may be supplied to each server through connection to a corresponding interface board (see 820 of FIG. 8). The interface board may reduce or prevent a voltage drop phenomenon by inrush current occurring in a server when applying initial power to the server, and may be applied to an existing DC power transfer based data center.

As an example, the interface board according to some example embodiments may be configured in a detachable form, for example, a module and may be combined in a space in which a PSU is absent from an existing server.

The power supply device 100 may further include a remote power monitoring unit configured to monitor an operating state of each of the plurality of servers included in the rack, and to activate or inactivate each of the plurality of PSUs included in the DC power supply, based on the operating state of the corresponding server. The remote power monitoring unit may include a camera, a temperature sensor, and the like, to remotely monitor an operating state, an output state, and the like of a server.

Figure 2:
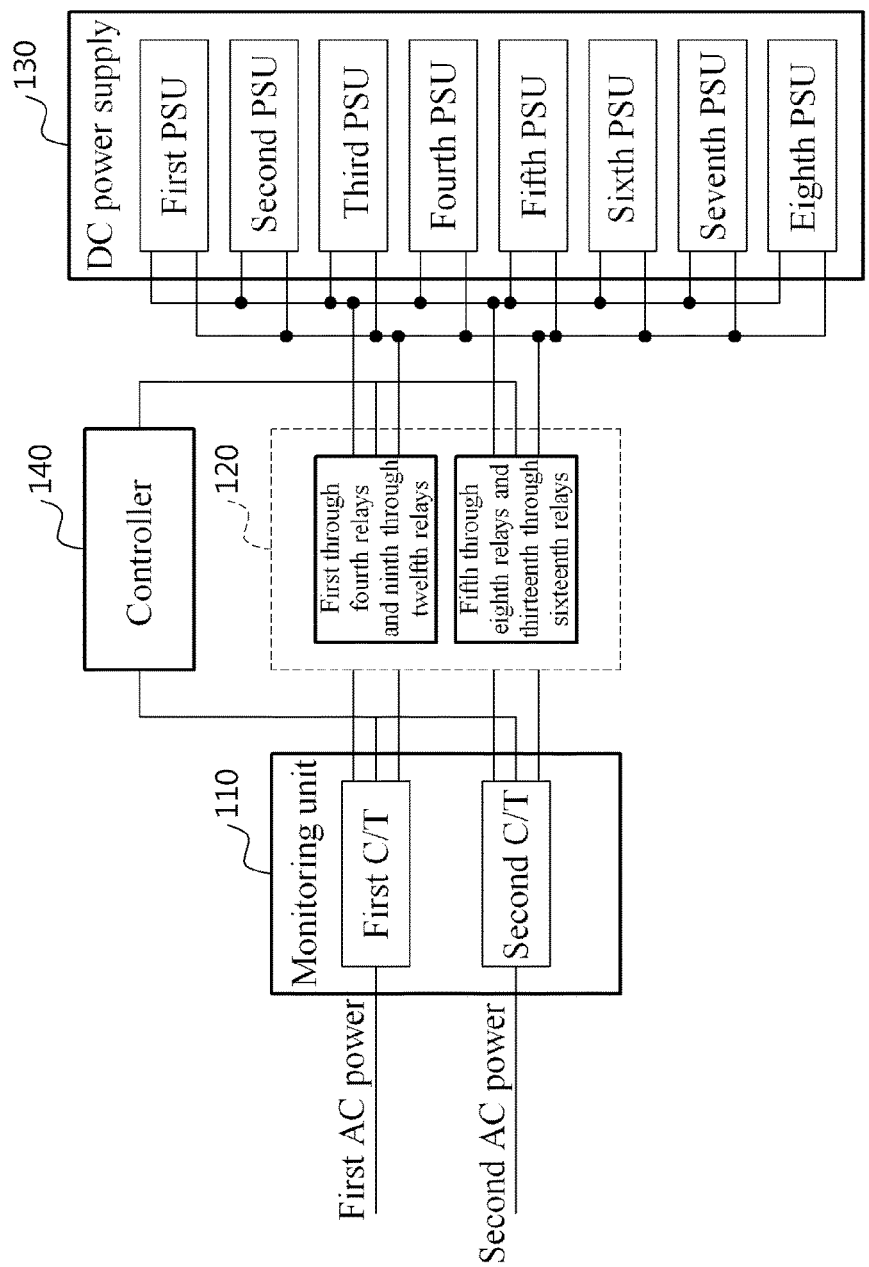
FIG. 2 is a diagram describing a power supply device according to some example embodiments in more detail.

FIG. 2 is a diagram describing a power supply device according to some example embodiments in more detail. Hereinafter, an example in which first AC power and second AC power are input from two sources will be described with reference to FIG. 2.

The monitoring unit 110 may sense the first AC power using a first current transformer (C/T) configured to sense voltage and current of the first AC power and may sense the second AC power using a second C/T configured to sense voltage and current of the second AC power, and may transmit sensing values to the controller 140.

When all of the first AC power and the second AC power are monitored as being stable as the monitoring result, the first AC power and the second AC power may be supplied to the DC power supply 130 through the relay 120.

Referring to FIG. 2, the DC power supply 130 may include a plurality of PSUs, for example, first through eighth PSUs. The plurality of PSUs is connected in parallel to uniformly distribute power and thus, it is possible to reduce or minimize heat emission and to reduce or prevent an error from occurring due to the fault of a PSU. Also, an existing power supply device is configured to independently operate by applying AC power to an individual PSU of each server and thus, a data loss may occur in a server in response to an input of unstable power. However, the power supply device according to some example embodiments may supply the first AC power and the second AC power from different sources to the respective PSUs through the relay 120 and thus, may control the relay 120 to switch a supply of input power so that stable power may be supplied, when unstable power is applied, due to a blackout, for example.

To this end, the relay 120 may include, for example, first through fourth relays and ninth through twelfth relays configured to switch the first AC power, and fifth through eighth relays and thirteenth through sixteenth relays configured to switch the second AC power. The relay 120 may switch a supply of the AC power to be supplied to the DC power supply unit to any one of the first source and the second source, based on a switch signal transmitted from the controller 140.

The controller 140 may monitor the first AC power and the second AC power to be supplied to the DC power supply 130 based on sensing values received from the monitoring unit 110. The controller 140 may control only the second AC power to be supplied to the DC power 130 supply by switching the first through fourth relays and the ninth through twelfth relays when the first AC power is unstable, and may control only the first AC power to be supplied to the DC power supply 130 by switching the fifth through eighth relays and the thirteenth through sixteenth relays when the second AC power is unstable.

The controller 140 may continuously monitor the first AC power and the second AC power in a state in which the input voltage is switched. When normal AC power is input from a source from which unstable AC power has been input, the controller 140 may switch an input of the AC power to an original state to make it possible to receive a self-voltage. The capacitor or the Li polymer battery having supplied the DC power may have a charging time in order to reduce or prevent an occurrence of a voltage drop phenomenon, for example, a dip phenomenon and thus, the controller 140 may switch the input of the AC power to an original state at a delay of about 30 seconds.

Figure 3:
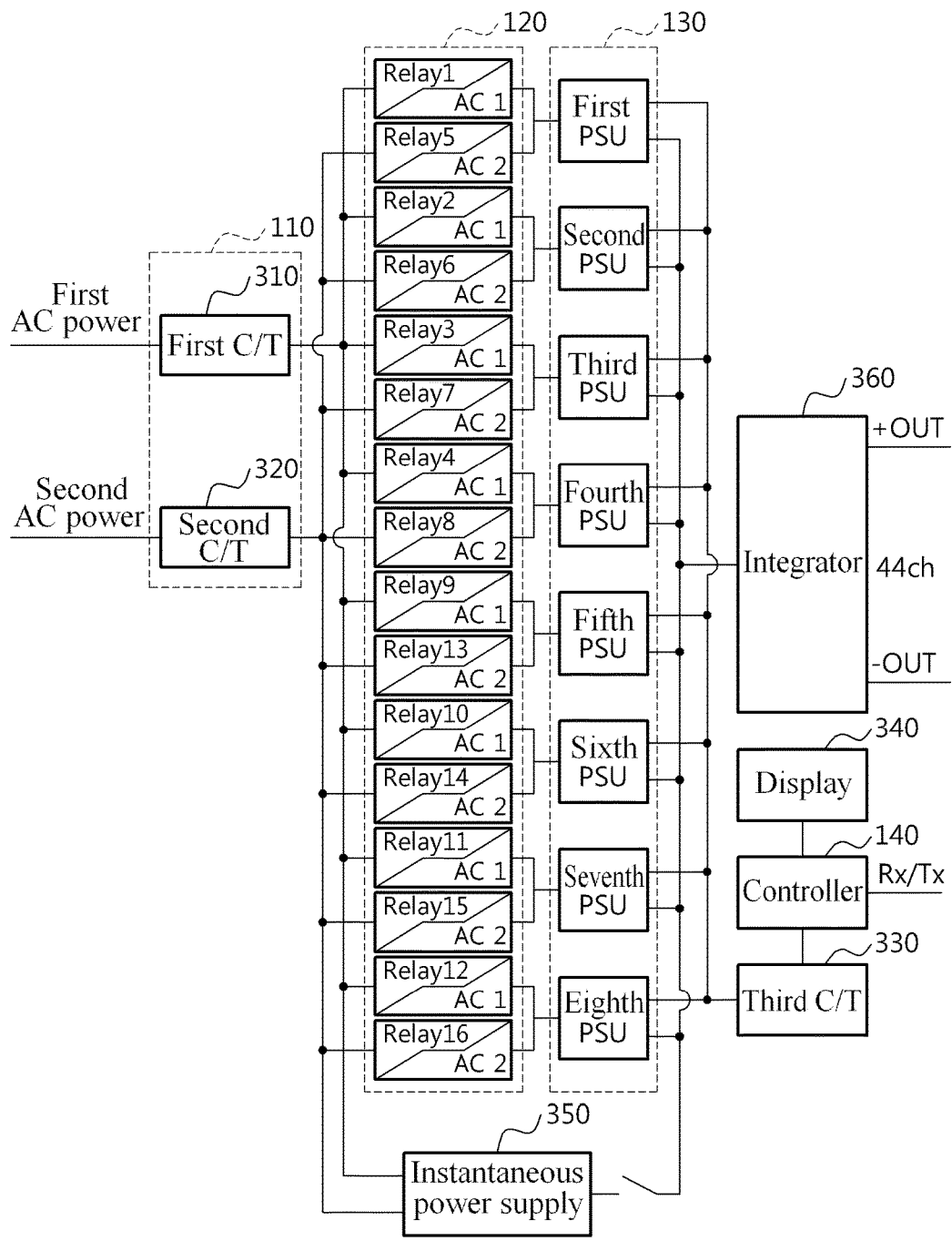
FIG. 3 is a diagram illustrating a detailed configuration of a power supply device according to some example embodiments in more detail.
Figure 4:
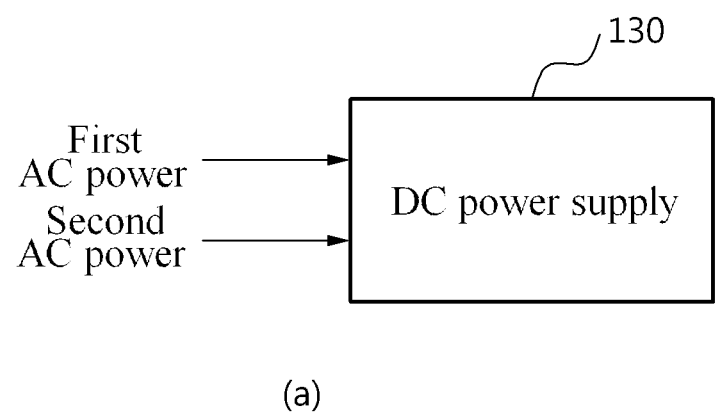
FIG. 4 is a diagram illustrating a switching a supply of power from a first source to a second source when unstable power is input from the first source according to some example embodiments in more detail.
Figure 4:
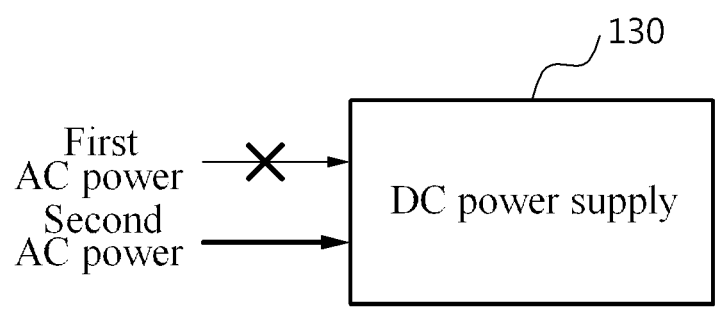

FIG. 3 is a diagram illustrating an example detailed configuration of a power supply device according to some example embodiments of the present invention, and FIG. 4 is a diagram illustrating a switching a supply of power from a first source to a second source when unstable power is input from the first source according to some example embodiments in more detail.

When unstable power is supplied due to, for example, an overload and/or a blackout, data recorded in a server may be lost. Accordingly, to prevent this, the power supply device may be supplied with multiplexed AC power from different sources. FIG. 3 illustrates an example in which input power is duplexed into first AC power and second AC power.

When first AC power and second AC power are supplied, the monitoring unit 110 senses voltage and current of the first AC power using a first C/T 310 and senses voltage and current of the second AC power using a second CIT 320, and transmits sensing values to the controller 140.

Referring to FIG. 3, the relay 120 includes a plurality of SSRs, for example, first through sixteenth relays, and transfers the first AC power and the second AC power to the respective PSUs, for example, first through eighth PSUs included in the DC power supply 130. Although FIG. 3 illustrates an example in which the first AC power is supplied to the first through eighth PSUs using the first through fourth relays and the ninth through twelfth relays and the second AC power is supplied to the first through eighth PSUs using the fifth through eighth relays and the thirteenth through sixteenth relays, the number of relays and the number of PSUs may be modified based on necessity.

When all of the first AC power and the second AC power are stable, the first AC power and the second AC power may be supplied to the DC power supply 130 as illustrated in a part (a) of FIG. 4. However, when the first power supply is unstable, the first through fourth relays and the ninth through twelfth relays may switch a supply of AC power to be supplied to the DC power supply 130 from the first AC power to the second AC power based on a switch signal of the controller 140.

To this end, the controller 140 may generate a switch signal for switching the supply of the AC power to any one of the first source and the second source based on sensing values received from the monitoring unit 110, and may transmit the switch signal to a corresponding relay.

As an example, when unstable AC power is input from the first source for a predetermined or desired period of time or more, for example, 50 ms or more, the controller 140 may switch the supply of the AC power from the first source to the second source. Similarly, when unstable AC power is input from the second source for the predetermined or desired period of time or more, the controller 140 may switch the supply of the AC power from the second source to the first source.

When the supply of the AC power is switched by the controller 140, instantaneous input voltage is blocked and an operation of a PSU is suspended whereby a voltage drop phenomenon, for example, a dip phenomenon occurs in output power. To reduce or prevent this, the instantaneous power supply 350 supplies DC power to a rack when switching the AC power being supplied to the DC power supply 130. As an example, the instantaneous power supply 350 may supply, to a rack, DC power charged in a capacitor or a Li polymer battery when switching the AC power being supplied to the DC power supply 130.

The instantaneous power supply 350 may include a rectifier circuit configured to rectify the duplexed AC power to DC power and a constant voltage circuit configured to maintain the rectified DC power to be at constant voltage. Also, not to affect a PSU when charging the capacitor or the Li polymer battery, the instantaneous power supply 350 may include a diode or a FET. Accordingly, although an error occurs in any one input AC power, the instantaneous power supply 350 may charge the capacitor or the Li polymer battery with normal power. As described above, separate power may be used instead of charging the capacitor or the Li polymer battery with the DC power. When the charging material applies initial power to the PSU, the initial power of the charging material has a short value. Therefore, a power output of the PSU is instantaneously shorted when the initial power is applied to PSU, and the power output of the PSU is not normally outputted. To avoid this, the instantaneous power supply 350 may charge the charging material with the AC power up to a predetermined or desired level by employing an electrical switch between the charging material and a PSU output, and enables the charging material to interact with an output by connecting a switch when it is beyond the predetermined or desired level.

The controller 140 may maintain the efficiency of the power supply device to be at a higher or maximum value at all times by monitoring states of the first through eighth PSUs included in the DC power supply 130 using a third C/T 330 and by activating or inactivating each PSU based on server operation capacity. The controller 140 may control information on the first AC power, the second AC power, and the first through eighths PSUs to be displayed on a display 340 connected to the controller 140. Also, the controller 140 may transmit information on the first AC power, the second AC power, and the first through eighth PSUs to a remote power monitoring device, or may receive a switch signal from the remote power monitoring device.

When AC power being supplied to the DC power supply 130 is switched, the controller 140 may maintain the switched state for a predetermined or desired period of time, for example, five to ten minutes and may monitor the AC power supplied from the AC power supply. When normal AC power is input from a source from which unstable AC power has been input as the monitoring result, the controller 140 may switch the supply of power to an original state.

DC power supplied from the DC power supply 130 may be integrated through the integrator 360 and may be supplied to each server installed in a rack.

A power supply device according to the related art may employ individual power for each server and thus, may affect a server operation when an error occurs in a PSU. Also, the efficiency of a PSU may vary based on a state of the individually used PSU and thus, it may be difficult to achieve an improved or maximum effect. However, as described above, the power supply device according to some example embodiments enables power to be more uniformly distributed by employing a plurality of PSUs, for example, the first through the eighth PSUs in parallel and thus, it is possible to reduce or minimize heat emission and to reduce or prevent an error from occurring due to the fault of a PSU. Also, it is possible to maintain the power supply device to be in an improved or optimal state at all times by activating or inactivating each PSU based on an operating state of a server using a remote power monitoring unit.

Also, the power supply device according to the related art may be configured to independently operate by applying AC power to an individual PSU of each server and thus, there is no measure for unstable input power. However, the power supply device according to some example embodiments may supply two input powers, for example, the first AC power and the second AC power, from different sources to the respective PSUs through the relay 120. Accordingly, when unstable power is applied due to, for example, a blackout, the power supply device according to some example embodiments may switch a supply of input power so that stable power may be supplied, based on a switch signal transmitted from the controller 140 or the remote power monitoring unit. Also, the power supply device may monitor the input power while maintaining the switched state for a predetermined or desired period of time, for example, five to ten minutes and may switch the supply of power to an original state again when normal power is supplied from a source in which the error has occurred.

The instantaneous power supply 350 may include a Li polymer battery or a capacitor to instantaneously supply DC power in response to switching the input power. In the case of supplying the DC power using a general battery, a periodic check may be required due to a volume issue and a decrease in a lifespan by charging/discharging or natural discharging. When a predetermined or desired period of time has elapsed, management and/or maintenance costs may increase. Also, due to a characteristic of the general battery, the general battery has nominal voltage. Thus, when charging the battery voltage up to the nominal voltage, a lifespan of the battery may be reduced. When fully charging the battery voltage, the battery voltage may be instantaneously discharged even up to the nominal voltage due to an occurrence of a dip phenomenon, which may lead to resetting a server. Accordingly, by employing a semi-permanently available capacitor, it is possible to reduce management cost and/or maintenance cost, and to readily use the capacitor up to the charged voltage. In addition, a relatively short charging time may be needed compared to a general battery.

Also, the power supply device according to some example embodiments may perform real-time management using a controller or a remote power monitoring unit, may reduce an amount of power unnecessarily used by activating or inactivating each PSU based on a server capacity, and/or may distribute load against input by monitoring input voltage or current and by switching the input power using a relay when the input voltage is unstable, and by monitoring the input voltage for a predetermined or desired period of time after switching and by switching a supply of power to an original state when the input power is restored to be normal.

Figure 5:
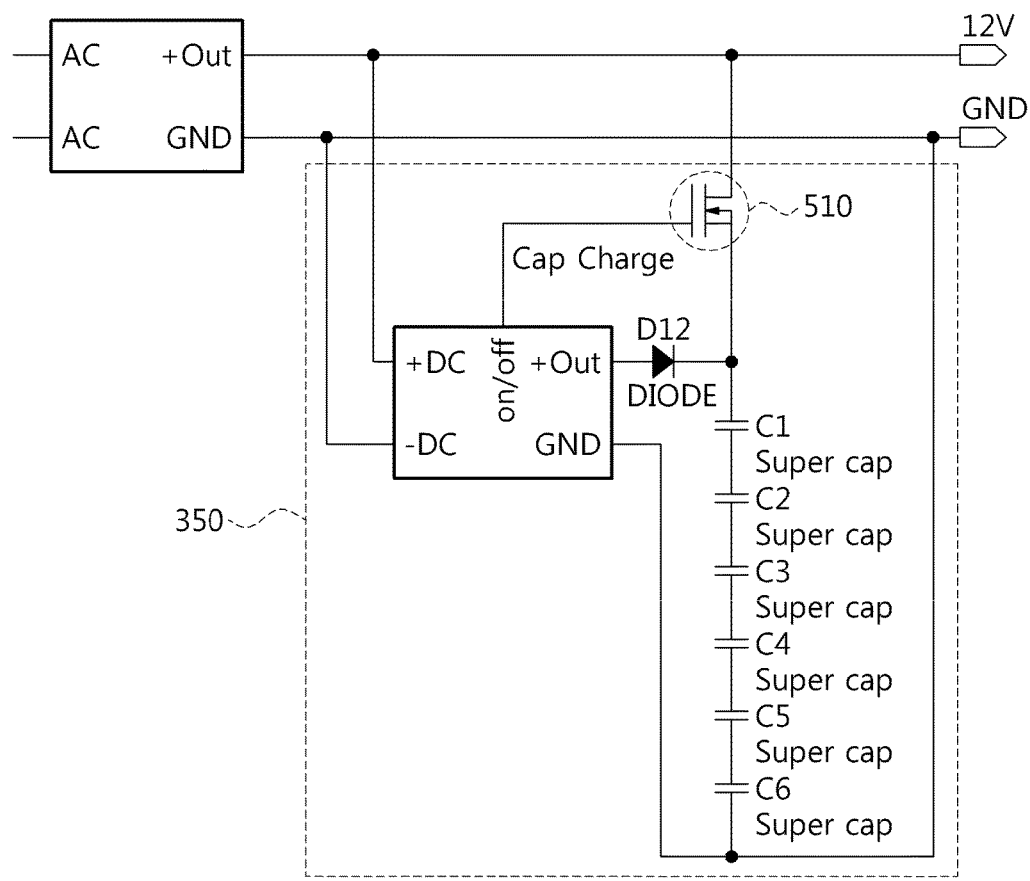
FIGS. 5 and 6 are circuit diagrams illustrating an instantaneous power supply according to some example embodiments in more detail.
Figure 6:
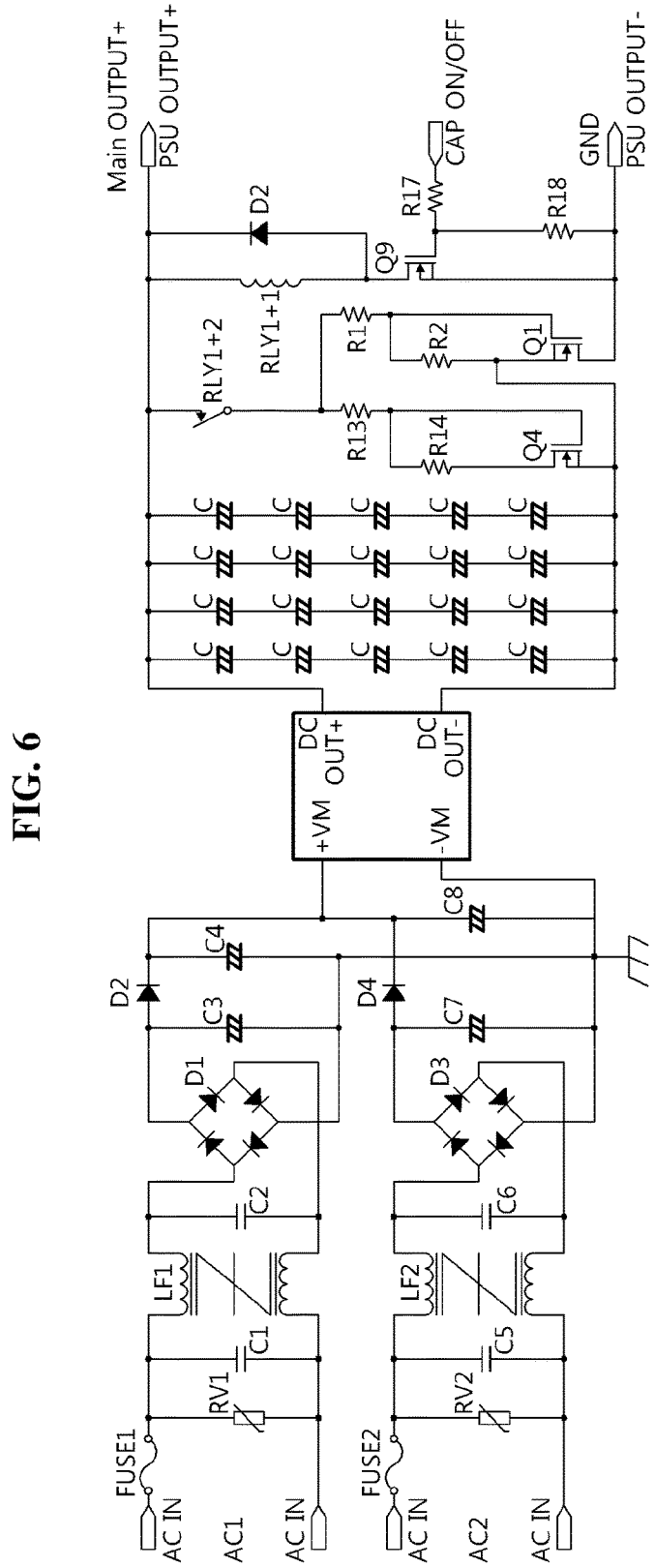
Figure 7:
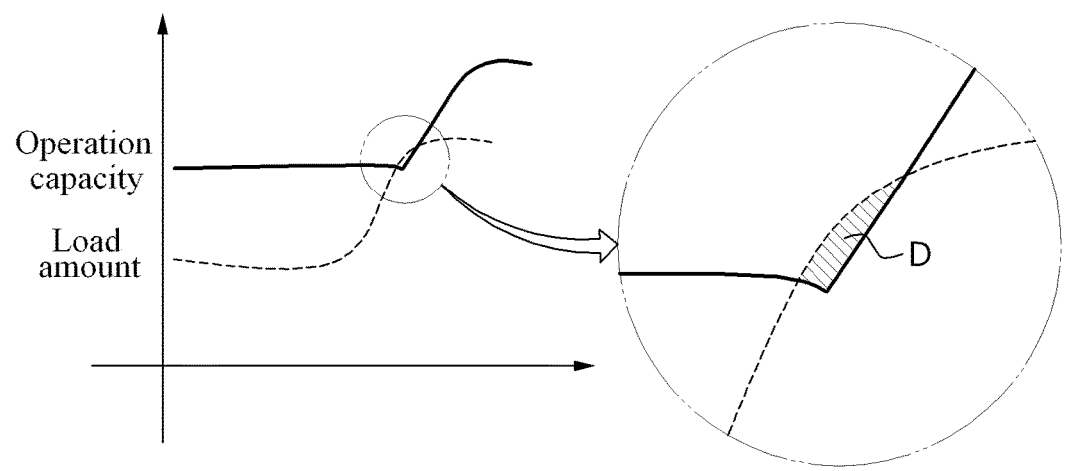
FIG. 7 is a graph showing a load amount of direct current (DC) power and operation capacity of alternating current (AC) power according to some example embodiments in more detail.

FIG. 5 is a circuit diagram illustrating an instantaneous power supply according to some example embodiments, FIG. 6 is a circuit diagram illustrating a detailed configuration of the instantaneous power supply, and FIG. 7 is a graph showing a load amount of DC power and operation capacity of AC power according to some example embodiments of the present invention.

As an example, as illustrated in FIG. 5, the instantaneous power supply 350 may include super capacitors connected in series, and may also be configured to include a detachable package that is divided based on predetermined or desired capacity for an easy replacement depending on a necessity. When output voltage is higher than self-voltage strength, a super capacitor combust (or arc) and thus, the super capacitors may be connected in series to have the self-voltage strength higher than the output voltage. The instantaneous power supply 350 may include a diode or a FET 510 to reduce or prevent a PSU from being affected when charging the super capacitor.

Also, referring to FIG. 5, the instantaneous power supply 350 may include, at a front end, a separate rectifier circuit configured to charge the super capacitor with DC power, a rectifier circuit configured to rectify duplexed AC power to DC power, and a constant voltage circuit. Accordingly, although an error occurs in any one input AC power, the instantaneous power supply 350 may charge the super capacitor with the normal power. As described above, separate power may be used instead of charging the super capacitor with the DC power. It is because a characteristic of the super capacitor having a short value when applying initial power may cause a PSU power output to be instantaneously shorted and thereby not be normally output when an output is immediately connected. To avoid this, the instantaneous power supply 350 may charge the super capacitor with the AC power up to a predetermined or desired level by employing an electrical switch between the super capacitor and a PSU output, and enables the super capacitor to interact with an output by connecting a switch when it is beyond the predetermined or desired level.

When input power is switched, a load amount instantaneously rises as shown in an area D of the graph of FIG. 7 and thus, a dip phenomenon occurs. To avoid this, when switching the input power, an instantaneous power supply may instantaneously supply DC power charged in a battery or a capacitor, instead of a DC power supply.

FIG. 8 is a diagram describing a process of supplying DC power from a power supply device to a plurality of servers included in a rack according to some example embodiments of the present invention.

220V of AC power input from a plurality of sources to the power supply device 100 may be multiplexed and be supplied to the DC power supply 130 through the relay 120. The relay 120 may selectively control ON/OFF of a plurality of AC power inputs, or may multiplex an input of AC power using a switching method.

The DC power supply 130 converts, to DC power, AC power supplied through the relay 120. As an example, the DC power supply 130 may convert the AC power to about 12V/100 A of DC power. The DC power supply 130 may include a plurality of PSUs configured to convert the AC power to the DC power.

The integrator 360 may integrate the DC power converted by the DC power supply 130. As an example, the integrator 360 may be connected with the DC power supply 130 through a bus bar that is a conductor for transferring power. To stably supply the power, the integrator 360 may distribute the DC power supplied from the DC power supply 130 as the DC power within about 24V or of 12V.

At least one server 810 supplied with the DC power through the integrator 360 may be included in a rack 800. Referring to FIG. 8, each server 810 may be connected to the power supply device 100 through a corresponding interface board 820.

The interface board 820 is configured to supply, to the at least one server 810, the DC power supplied through the integrator 360, and may simplify a connection line such as a cable. The integrator 360 and the interface board 820 may be directly connected using a one-to-one cable.

Also, the interface board 820 may include an inrush current prevention circuit and thus, may reduce or prevent an occurrence of a voltage drop phenomenon by inrush current occurring in the at least one server 810 when applying initial power. The interface board 820 may also be applied to an existing DC power transfer based server.

The interface board 820 may include a noise removal circuit.

As an example, the power supply device 100 according to some example embodiments may supply DC power to each of the plurality of servers 810 included in the rack 800 by employing the appropriate interface board 820 for each server 810. For example, the power supply device 100 according to some example embodiments may directly supply the DC power even to a general server by using the interface board 820. Accordingly, various types of servers 810 may be added to the rack 800.

A rear surface of the interface board 820 may include an insulator (not shown) of epoxy base and the like. The insulator of the interface board 820 may function as a type of cover capable of insulating high current and may function to guide the interface board 820 to be connected to an inner main board (not shown) of the server 810, thereby enabling a safe and accurate connection of the interface board 820.

The power supply device 100 according to some example embodiments may include an instantaneous power supply (see 350 of FIG. 3). As described above, the instantaneous power supply may be configured using super capacitors connected to the DC power supply 130. The instantaneous power supply 350 may be charged with DC power and may supply power to each server 810 in the case of an emergency.

For example, the instantaneous power supply may avoid a dip phenomenon by not immediately responding to an instantaneous change in the DC power supply that occurs due to instantaneous rise in a load amount of the DC power supply 130 and by slowly responding to the change after a predetermined or desired delay. The instantaneous power supply may supply the DC power to the interface board 820, thereby enabling the stable power supply to be secured.

Also, the instantaneous power supply may supply the DC power in response to an instantaneous blackout occurring due to a switching time delay. Due to an error occurring in any one AC power supplied from a plurality of sources, the switching time delay may occur when switching a supply of the AC power from a corresponding source to another source that supplies stable AC power. That is, when an error such as an instantaneous blackout occurs in supplying power, the instantaneous power supply may instantaneously supply the power to the at least one server 810 to respond to the emergency, thereby enabling the power to be stably supplied.

Figure 9:
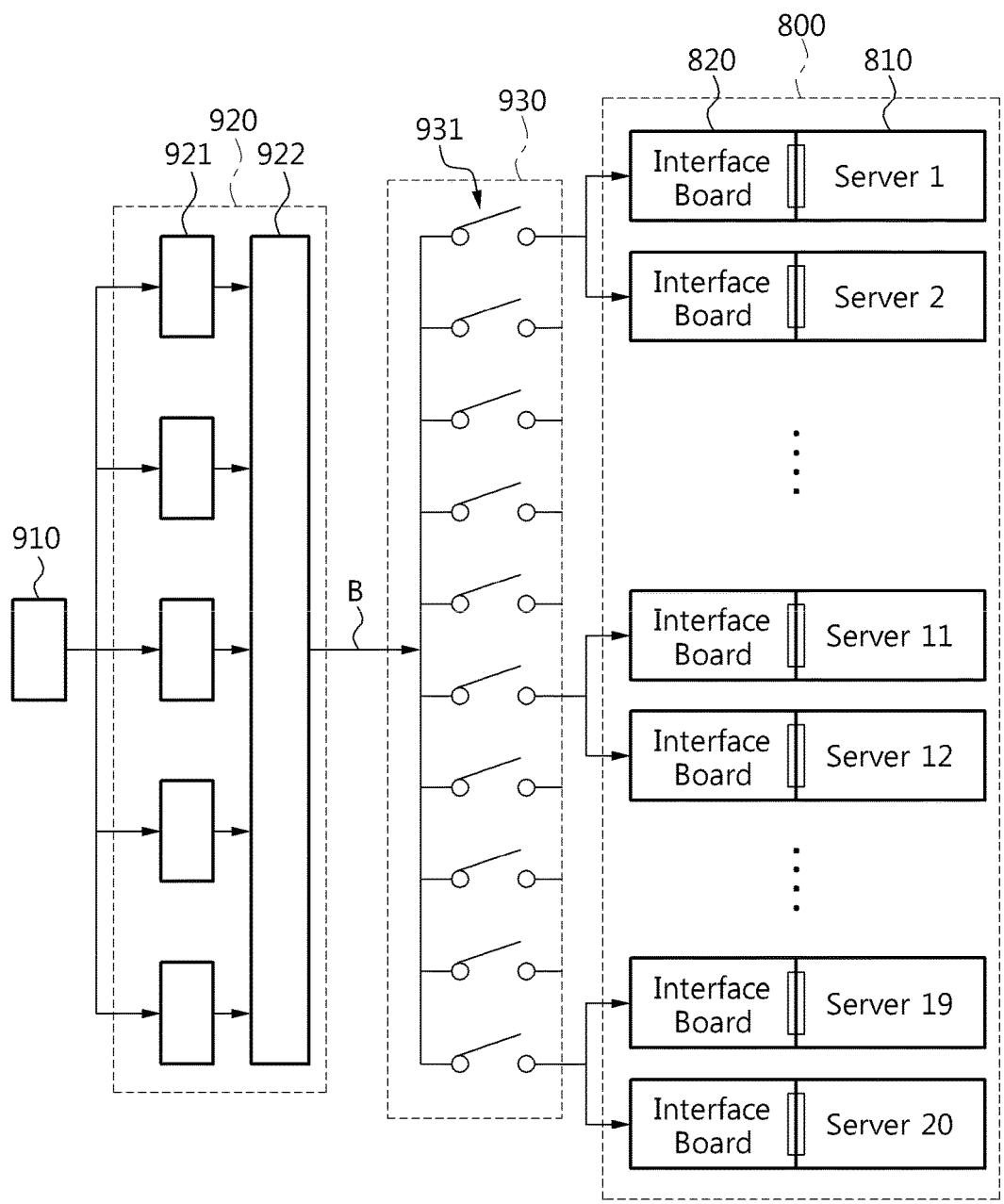
FIG. 9 is a diagram describing a process of supplying DC power from a power supply device to a plurality of servers included in a rack according to some example embodiments in more detail.

FIG. 9 is a diagram describing a process of supplying DC power from a power supply device to a plurality of servers included in a rack according to some example embodiments of the present invention.

Referring to FIG. 9, the power supply device may include a supply 910, a converter 920, and a distribution unit 930.

The supply 910 supplies at least one AC power. For example, the supply 910 may supply 220V of AC power. Although not illustrated in detail, the supply 910 may be configured to multiplex and thereby supply the AC power. In some example embodiments, the supply 910 may selectively control ON/OFF of a plurality of AC power inputs, or may multiplex the plurality of AC power inputs using a switching method.

The converter 920 converts, to DC power, the AC power supplied from the supply 910. The converter 920 may convert the AC power to about 12V/100 A of DC power. In some example embodiments, the converter 920 may include a plurality of rectifiers 921 configured to convert the supplied AC power to the DC power and an integrator 922 configured to integrate the converted AC power.

The distribution unit 930 distributes the DC power converted by the converter 920 and controls applying of overcurrent. The distribution unit 930 may include a plurality of distributors 931, and may reduce or prevent distribution of the DC power in response to applying of the overcurrent when distributing the DC power using the plurality of distributors 931. The distribution unit 930 may be connected with the converter 920 through a bus bar B that is a conductor to transfer electrical energy.

To stably supply the power, the DC power distributed from the distribution unit 930 may be supplied to the rack 800 as power within about 24V or of 12V and about 18 A.

At least one server 810 configured to be supplied with the DC power distributed by the distribution unit 930 maybe included in the rack 800. For example, the number of servers 810 connected to each of ten distributors 931 included in the distribution unit 930 may be at the ratio of two folds or more and thereby be supplied with the DC power. Referring to FIG. 9, two servers 810 are connected to a single distributor 931 and thus, twenty servers 810 corresponding to ten distributors 931 are included in the rack 800.

Each server 810 may be connected to the power supply device through the corresponding interface board 820. The interface board 820 may refer to a type of a connection device configured to supply the DC power supplied from the power supply device to the at least one server 810 and may simplify a connection line such as a cable.

The DC power is supplied from the distribution unit 930 to one side of the interface board 820. Although a portion that connects the interface board 820 and the distribution unit 930 is not illustrated in detail, a connector for high current and a fuse for reducing or preventing overcurrent may be provided. Another side of the interface board 820 may be connected to a main board (not shown) of the at least one server 810 to supply the power supplied from the distribution unit 930 to the at least one server 810. The other side of the interface board may be provided with a structure of a socket similar to a PSU of the at least one server 810. Although not illustrated, a noise removal circuit may be further included.

Figure 10:
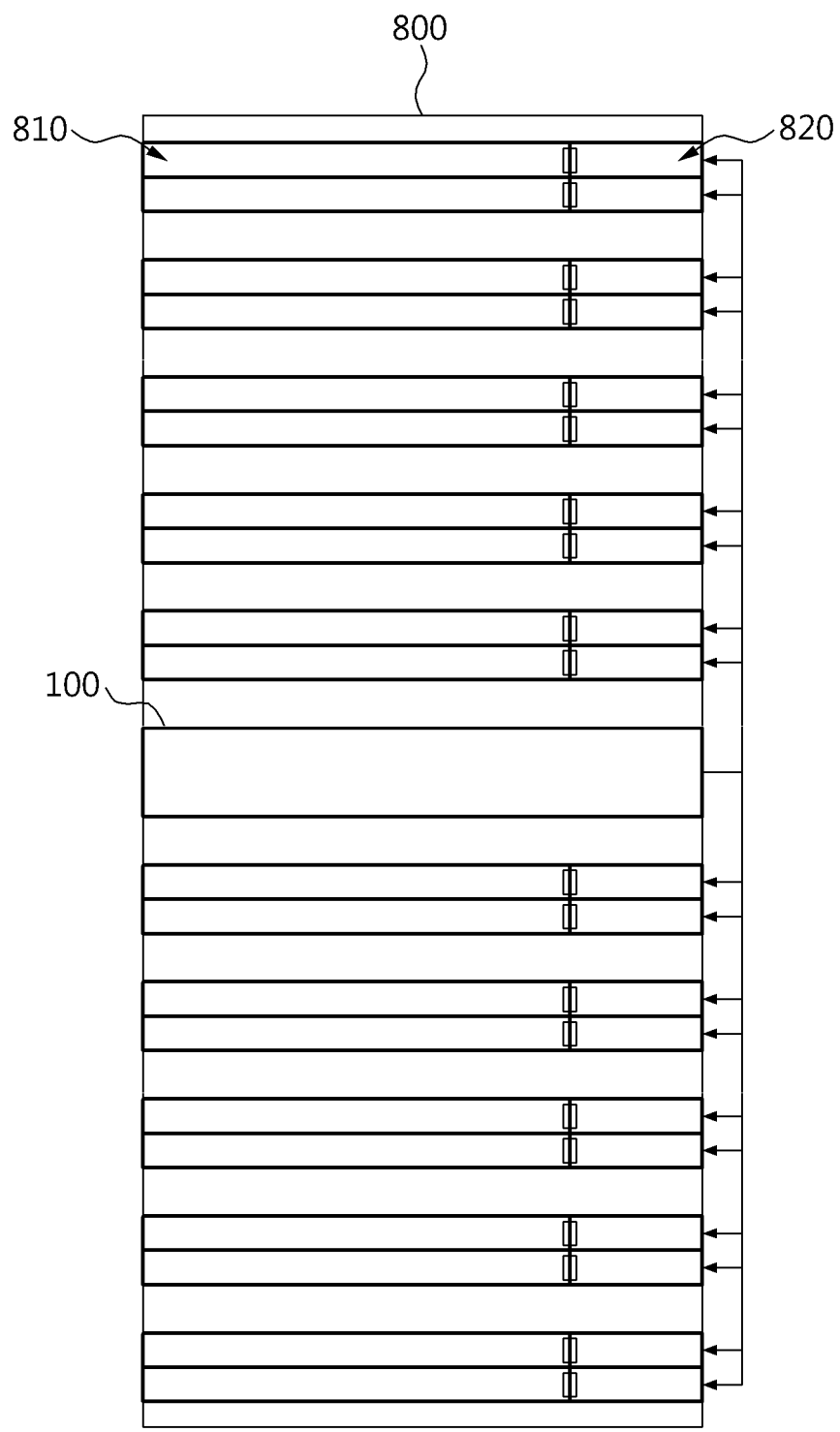
FIG. 10 is a diagram illustrating an example of a state in which a power supply device is installed in a rack according to some example embodiments in more detail.
Figure 11:
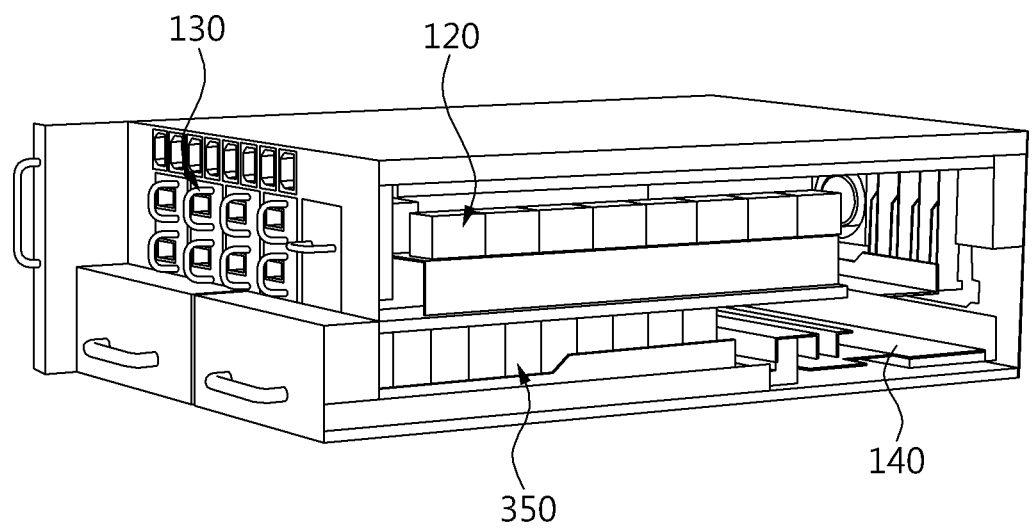
FIG. 11 is a perspective view illustrating a power supply device according to some example embodiments in more detail.

FIG. 10 is a diagram illustrating an example of a state in which a power supply device is installed in a rack according to some example embodiments of the present invention, and FIG. 11 is a perspective view illustrating a power supply device according to some example embodiments of the present invention.

Referring to FIG. 10, a single power supply device 100 may be received in a single rack 800. As described above, the power supply device 100 may include the relay 120, the DC power supply 130, the integrator 360, and the like. The integrator 360 may supply the DC power supplied from the DC power supply 130 to each server 810 included in the rack 800 through the corresponding interface board 820.

The power supply device 100 may be positioned in an upper portion or a central portion of the rack 800. As an example, when the power supply device 100 is positioned in a central portion of the rack 800, a voltage drop of about 0.2V to 0.3V may occur between servers positioned at a top end and a bottom end among the plurality of servers 810 included in the rack 800. To compensate for this, the DC power supply 130 may increase an output of DC power by about 0.3V.

When twenty servers 810 each having the power capacity of 20 A are included in a single rack 800, the rack 800 requires a total of 400 A power capacity. Accordingly, when initially operating the twenty servers 810, the twenty servers 810 may operate at about 80% of 500 A corresponding to the capacity of DC power supplied from the DC power supply 130. For example, in a case in which the DC power supply 130 includes five PSUs configured to provide 200 A of DC power capacity, although any one of the five PSUs malfunctions, the remaining four PSUs may provide 400 A of DC power capacity and thus, the power may be stably supplied to the servers 810. In addition, when load of a single server 810 among the plurality of servers 810 is assumed as about 12 A in a normal operating state, the twenty servers 810 require about 240 A of DC power capacity. Accordingly, although the DC power supply 130 supplies 400 A of DC power capacity, about 60% of load operation is enabled. Therefore, the power supply device according to some example embodiments may stabilize the power supply through the above configuration.

As an example, referring to FIG. 11, the power supply device according to some example embodiments may be configured as a single device embedded with the relay 120, the DC power supply 130, the controller 140, the instantaneous power supply 350, and the like, and may be housed in a rack.

Figure 12:
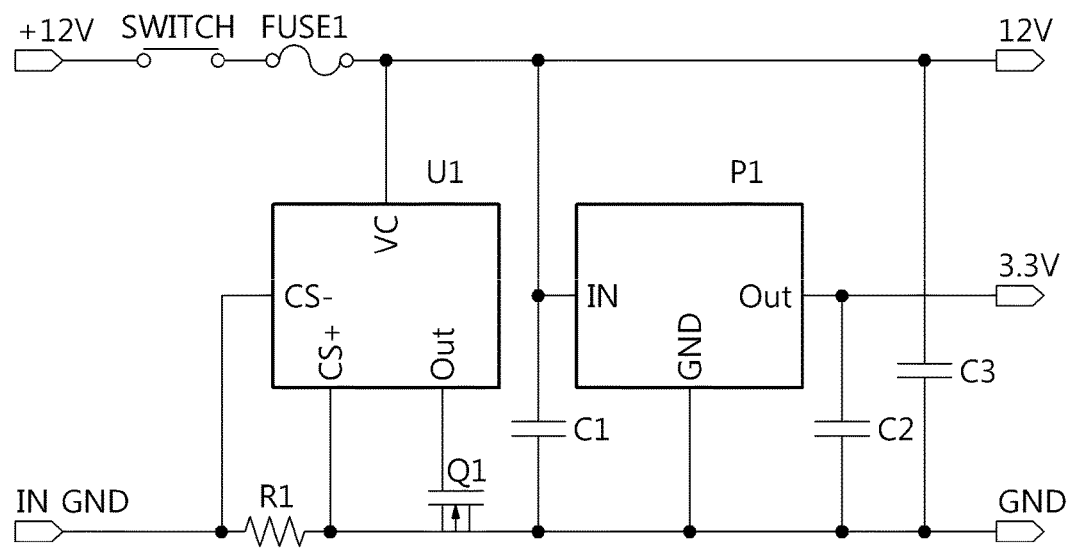
FIG. 12 is a circuit diagram illustrating an interface board according to some example embodiments in more detail.

FIG. 12 is a circuit diagram illustrating an interface board according to some example embodiments of the present invention.

The interface board may supply DC power to a server and may also control inrush current occurring in the server when applying initial power to the server to occur at a reduced or minimum level, thereby reducing or preventing an occurrence of a dip phenomenon by the inrush current and supplying the stable power.

To this end, referring to FIG. 12, adding a switch to an input end enables cutting off power when an error occurs at a final output end. Also, it permits stably supplying auxiliary power, for example, 3.3V to the server by adding a power converter.

A product connectible to a server may be applicable as a connector of an interface board.

Figure 13:
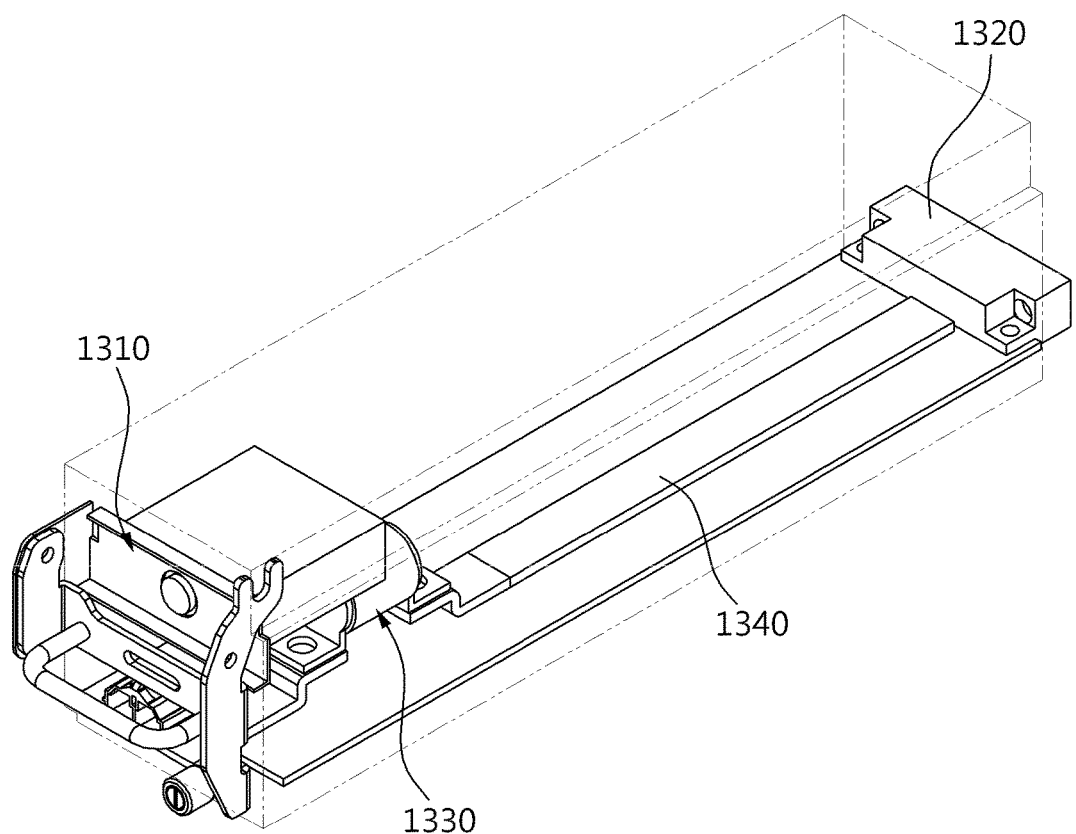
FIG. 13 is a perspective view illustrating an interface board according to some example embodiments in more detail.

FIG. 13 is a perspective view illustrating an interface board according to some example embodiments.

Referring to FIG. 13, as an example, the interface board may include an input unit 1310 configured to receive DC power from an external power supply device converting AC power to the DC power and a supply 1320 configured to supply the received DC power to a server included in a rack, and may be directly connected to each server disposed based on a rack unit instead of an existing PSU. The interface board may be differently manufactured based on DC capacity of the server and a connection method with the server.

The interface board may include an inrush current preventer 1330 configured to reduce or prevent an occurrence of a voltage drop phenomenon by inrush current occurring in the server when applying initial power to the server. In some example embodiments, the inrush current preventer 1330 may include a fuse configured to reduce or prevent an input of current higher than the inrush current.

Also, although not illustrated in FIG. 13, the interface board may include a switch configured to cut off the power when the current is input through the supply 1320. In addition, the interface board may include a power converter configured to convert, to a predetermined or desired voltage, DC power supplied from an external power supply device, thereby enabling auxiliary power to be more stably supplied to the server.

The interface board may include a bus bar 1340 for heat emission of an inrush current prevention circuit and a ground (GND) guarantee. The rear surface of the interface board may be configured as an epoxy-based electro-thermal body. Also, a state indication light emitting diode (LED) configured to verify and adjust a power supply state of the server may be included in the interface board.

Figure 14:
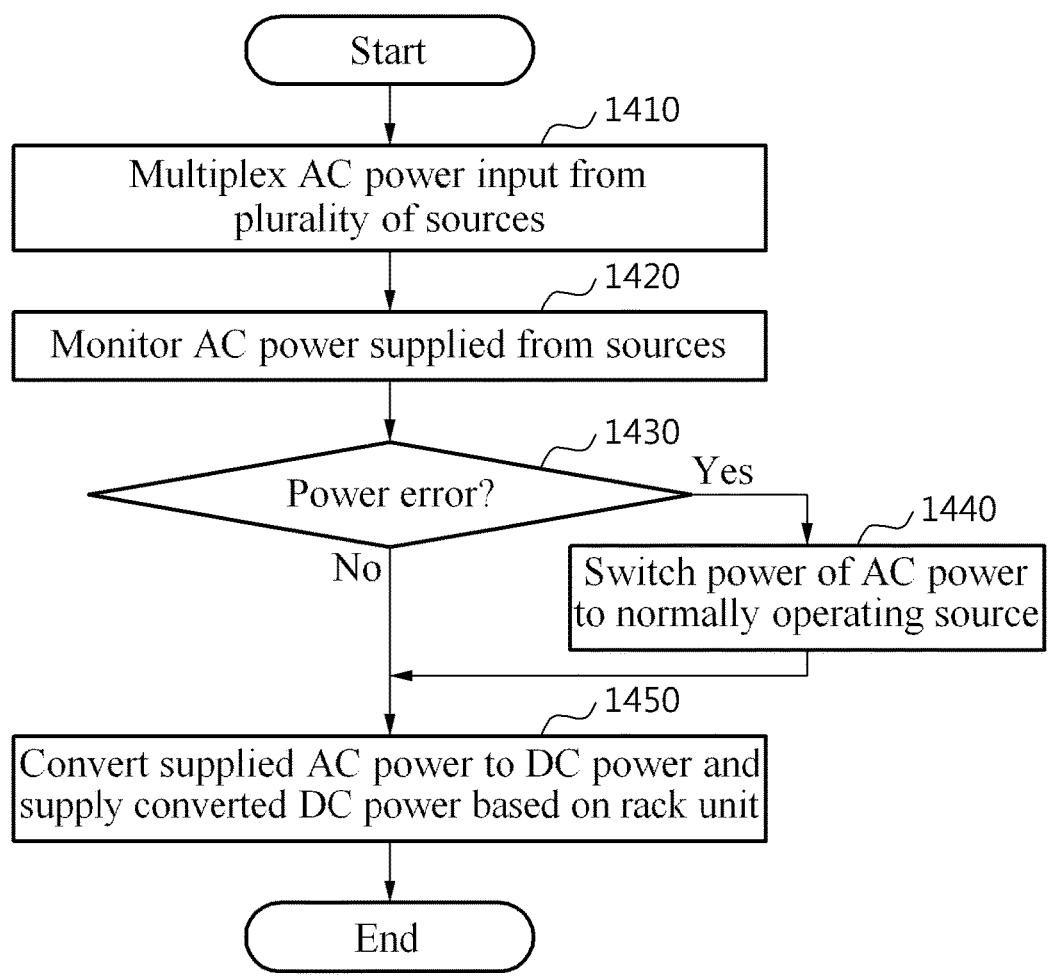
FIG. 14 is a flowchart illustrating a power supply method according to some example embodiments in more detail.

FIG. 14 is a flowchart illustrating a power supply method according to some example embodiments.

In operation 1410, a power supply device receives and multiplexes AC power from a plurality of different sources to supply stable DC power based on a rack unit disposed in a data center and to maintain the power efficiency to be in an improved or optimal state.

In operation 1420, a monitoring unit of the power supply device monitors the AC power supplied from the sources. As an example, when input power of the power supply device is duplexed into first AC power and second AC power, the monitoring unit may sense each of voltage and current of the first AC power and voltage and current of the second AC power, and may transmit sensing values to a controller of the power supply device.

When the controller of the power supply device detects an occurrence of a power error in the first AC power or the second AC power based on the sensing values received from the monitoring unit in operation 1430, the controller generates a switch signal for switching a supply of the AC power to a normally operating source and transmits the switch signal to a relay, thereby enabling the AC power to be stably supplied in operation 1440. The relay may switch the AC power supplied from an AC power supply to any one of a first source and a second source. As an example, the relay may be an SSR.

As an example, when unstable AC power is input from the first source for a predetermined or desired period of time or more, for example, 50 ms or more, the controller of the power supply device may switch a supply of the AC power from the first source to the second source. Similarly, when the unstable AC power is input from the second source, the controller of the power supply device may switch the supply of the AC power from the second source to the first source.

When the supply of the AC power is switched, instantaneous input voltage is blocked and an operation of a PSU is suspended whereby a dip phenomenon occurs in output power. To reduce or prevent this, when the supply of the AC power is switched, an instantaneous power supply of the power supply device may supply, to a server, DC power charged in a capacitor or a Li polymer battery. When charging, for example, the capacitor or the Li polymer battery, it may affect the DC power to be supplied to a PSU. Accordingly, to reduce or prevent this, the instantaneous power supply may use at least one of a diode and a FET.

The controller may maintain the switched state for a predetermined or desired period of time, for example, five to ten minutes after switching the supply of the AC power, and may monitor the AC power being supplied from the AC power supply. When normal AC power is verified to be input from a source from which the unstable AC power has been input as the monitoring result, the controller may switch a supply of power to an original state again.

In operation 1450, the AC power supplied through the above process may be converted to the DC power through a DC power supply and thereby be supplied to the plurality of servers included in a rack. The DC power supply may include a plurality of PSUs configured to convert the AC power being supplied to the DC power. The PSUs may be connected in parallel to supply the DC power to the plurality of servers.

The DC power supplied from the DC power supply may be integrated and distributed through an integrator, and thereby be supplied to the plurality of servers included in a rack. An interface board that connects the power supply device and a server may reduce or prevent an occurrence of a voltage drop phenomenon by inrush current occurring in the server when applying initial power to the server, thereby supplying power to each constituent element of the server. The interface board may also be applicable to an existing DC power transfer based server.

An operating state of each of the plurality of servers included in the rack may be monitored using a remote power monitoring unit. The remote power monitoring unit may activate or inactivate each of the plurality of PSUs included in the DC power supply based on the operating state of the corresponding server.

Although some example embodiments have been shown and described, the present invention is not limited to the described example embodiments and those skilled in the art may make various changes and modifications from the description. Accordingly, the scope of the present invention is not limited to the described example embodiments and is defined by the claims and their equivalents.

What is claimed is:

1. A power supply device, comprising:
   a plurality of relays each configured to switch alternating current power supplied from a plurality of sources;
   a direct current power supply configured to,
      receive the switched alternating current power supplied by at least two of the plurality of relays, and
      convert the switched alternating current power to direct current power; and
   a controller configured to generate a switch signal to control the plurality of relays to switch the sources based on a result of monitoring the alternating current power supplied from the plurality of sources,
   wherein the direct current power supply includes a plurality of power supply units (PSUs) each being connected to each other in parallel, each of the plurality of PSUs being connected to all of the plurality of sources, and
   wherein the controller is configured to switch a supply of the alternating current power from a first source to a second source when unstable alternating current power is received from the first source for a desired period of time or more, and
      switch the supply of the alternating current power from the second source to the first source when the unstable alternating current power is received from the second source for the desired period of time or more.

2. The power supply device of claim 1, wherein the controller is further configured to:
   monitor the alternating current power input received from the plurality of sources using at least one sensor.

3. The power supply device of claim 1, further comprising:
   an instantaneous power supply configured to prevent an occurrence of a voltage drop phenomenon by supplying the direct current power to a plurality of servers when switching a supply of the alternating current power.

4. The power supply device of claim 1, further comprising:
   a remote power sensor configured to monitor an operating state of a plurality of servers, and to activate or inactivate each of the plurality of PSUs based on the operating state of the corresponding server.

5. A power supply method of a power supply device, the method comprising:
   switching alternating current power supplied from a plurality of sources using a plurality of relays;
   receiving the switched alternating current power supplied by at least two of the plurality of relays using a direct current power supply including a plurality of power supply units (PSUs) each being connected to each other in parallel, each of the plurality of PSUs being connected to all of the plurality of sources;
   converting the switched alternating current power to direct current power using the direct current power supply; and
   generating a switch signal to control the plurality of relays to switch the sources based on a result of monitoring the alternating current power supplied from the sources using a controller,
   wherein the switching includes switching, using at least one relay of the plurality of relays, a supply of the alternating current power from a first source to a second source when unstable alternating current power is received from the first source for a desired period of time or more, and
   switching, using the at least one relay of the plurality of relays, the supply of the alternating current power from the second source to the first source when the unstable alternating current power is received from the second source for the desired period of time or more.

6. The method of claim 5, further comprising:
   preventing an occurrence of a voltage drop phenomenon by supplying, to a plurality of servers, the direct current power.

7. The method of claim 5, further comprising:
   monitoring an operating state of each of a plurality of servers using at least one remote power monitoring sensor; and
   activating or inactivating each of the plurality of PSUs based on the operating state of the corresponding server and supplying the direct current power to the plurality of servers.

* * * * *